(12) United States Patent
Sugiyama et al.

(10) Patent No.: US 11,285,636 B2
(45) Date of Patent: Mar. 29, 2022

(54) METHOD OF PRODUCING THREE-DIMENSIONAL OBJECT AND PRODUCTION APPARATUS USED THEREFOR

(71) Applicant: CANON KABUSHIKI KAISHA, Tokyo (JP)

(72) Inventors: Akira Sugiyama, Yokohama (JP); Yukio Hanyu, Isehara (JP); Naotake Sato, Yokohama (JP); Masahiko Takahashi, Tokyo (JP); Tomohiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 16/809,211

(22) Filed: Mar. 4, 2020

(65) Prior Publication Data
US 2020/0198179 A1 Jun. 25, 2020

Related U.S. Application Data

(63) Continuation of application No. PCT/JP2018/033405, filed on Sep. 10, 2018.

(30) Foreign Application Priority Data

Sep. 12, 2017 (JP) .............................. JP2017-174502
Sep. 12, 2017 (JP) .............................. JP2017-174503

(51) Int. Cl.
*B28B 1/00* (2006.01)
*C04B 35/626* (2006.01)
(Continued)

(52) U.S. Cl.
CPC ........ *B28B 1/001* (2013.01); *C04B 35/62645* (2013.01); *C04B 35/64* (2013.01);
(Continued)

(58) Field of Classification Search
CPC ......... B28B 1/001; B33Y 10/00; B33Y 30/00; B33Y 70/00; C04B 35/62645; C04B 35/64; C04B 2235/32
See application file for complete search history.

(56) References Cited

U.S. PATENT DOCUMENTS 10,183,332 B2 1/2019 Hirata et al.
10,532,383 B2 1/2020 Saito et al.
(Continued)

FOREIGN PATENT DOCUMENTS

JP 2005-144870 A 6/2005
JP 2015-38237 A 2/2015
(Continued)

OTHER PUBLICATIONS

International Search Report in International Application No. PCT/JP2018/033405 (dated Nov. 2018).
(Continued)

*Primary Examiner* — Mary Lynn F Theisen
(74) *Attorney, Agent, or Firm* — Venable LLP

(57) ABSTRACT

A three-dimensional object is obtained by repeating multiple times forming a ceramic powder layer formed of a ceramic powder and applying to a desired region of the ceramic powder layer a liquid precursor composition at least containing at least any one of a metal alkoxide, a metal chloride, a hydrolysate of the metal alkoxide and a polycondensate of the hydrolysate, and water, thereby obtaining a laminated body; subsequently heating the laminated body at a temperature lower than the sintering temperature of the ceramic powder; and removing the ceramic particle in a region to which the precursor composition has not been applied.

29 Claims, 5 Drawing Sheets

(51) Int. Cl.
  *C04B 35/64*    (2006.01)
  *B33Y 10/00*    (2015.01)
  *B33Y 30/00*    (2015.01)
  *B33Y 70/00*    (2020.01)

(52) U.S. Cl.
  CPC ............ *B33Y 10/00* (2014.12); *B33Y 30/00* (2014.12); *B33Y 70/00* (2014.12); *C04B 2235/32* (2013.01)

(56) References Cited

U.S. PATENT DOCUMENTS

| | | |
|---|---|---|
| 2015/0050463 A1 | 2/2015 | Nakano et al. |
| 2019/0111487 A1 | 4/2019 | Hirata et al. |
| 2020/0086559 A1 | 3/2020 | Sugiyama et al. |

FOREIGN PATENT DOCUMENTS

| | | |
|---|---|---|
| JP | 2015-205485 A | 11/2015 |
| WO | 2019/054320 A1 | 3/2019 |

OTHER PUBLICATIONS

International Preliminary Report on Patentability in International Application No. PCT/JP2018/033405 (dated Mar. 2020).

METHOD OF PRODUCING THREE-DIMENSIONAL OBJECT AND PRODUCTION APPARATUS USED THEREFOR

CROSS-REFERENCE TO RELATED APPLICATIONS

This application is a Continuation of International Patent Application No. PCT/JP2018/033405, filed Sep. 10, 2018, which claims the benefit of Japanese Patent Application No. 2017-174502, filed Sep. 12, 2017, and Japanese Patent Application No. 2017-174503, filed Sep. 12, 2017, all of which are hereby incorporated by reference herein in their entirety.

BACKGROUND OF THE INVENTION

Field of the Invention

The present invention relates to a method of producing a three-dimensional object made of a ceramic through additive manufacturing, and a production apparatus used for such a production method.

Description of the Related Art

In recent years, as a method of shaping a three-dimensional object, additive manufacturing has been focused, in which a shaping material is laminated according to the cross sectional data of a three-dimensional object model, which is the object to be shaped. Conventionally, resin materials have been the mainstream of the shaping material, but recently, the number of kinds of materials to be shaped has been expanding to ceramics, metals and the like.

Japanese Patent Application Laid-Open No. 2015-38237 discloses a method of obtaining a three-dimensional object by repeating a step of forming a ceramic powder layer and then performing local heating at a high temperature with a laser for sintering between ceramic particles. However, in such a method, the heating time is a short time, and therefore, the sintering between ceramic particles is insufficient and the strength tends to be deteriorated.

In addition, when a shaping part is formed on a non-shaping part in which a structure constituting the object to be shaped is not present, or when a so-called overhang structure is formed, it is necessary to sinter ceramic particles of the shaping part that is present on top of the non-shaping part. However, in some cases, warping may occur due to local thermal contraction upon such sintering, and therefore, for some shapes, it has been necessary to form a supporting part for the non-shaping part that suppresses warping. Such a supporting part needs to be removed after the shaping of a three-dimensional object, but ceramics not only have high material hardness, but also tend to be broken due to a load, and therefore, it has been difficult to remove the supporting part selectively. In addition, it is necessary to form the supporting part on the premise of the removal thereof, and therefore, in some cases, shaping a microstructure for which the supporting part cannot be formed has not been achieved.

In recent years, an approach has been reported, in which a three-dimensional object made of a ceramic is obtained by using a mixed material of a ceramic particle and a resin binder to make the shape of the three-dimensional object, then removing (deresinating) the resin binder, and sintering the object. In the production method disclosed in Japanese Patent Application Laid-Open No. 2015-205485, at first, a laminated body of a resin and a ceramic particle is obtained by repeating a step of, to a shaping layer in which ceramic particles are bound with a thermoplastic resin, applying a liquid binding agent including a resin component as a curing agent and a ceramic particle to cure the shaping layer. Subsequently, after removing a region to which such a liquid binding agent has not been applied, the resin component is heated and removed, and the ceramic particles are sintered to obtain a three-dimensional object. In this method, the region of the shaping layer to which the liquid binding agent has not been applied functions as a supporting body for an overhang structure.

However, in the method of Japanese Patent Application Laid-Open No. 2015-205485, after removing the supporting body, upon removing the resin component and carrying out the sintering of the ceramic particles, depending on the shape of an overhang structure, such a shape cannot be maintained, and there is a risk that deformation or breakage occurs. As such, there has been a limitation on the shape and size that can be shaped.

In addition, the shaping part also includes the resin component, and therefore, if the content of the resin component is large, deformation or breakage may occur due to the deresination, or voids may occur in the obtained three-dimensional object. In addition, in the case of a liquid binding agent in which the resin component is dissolved as a curing agent, if the concentration of the resin component is raised in order to raise the strength, the viscosity becomes high, and the liquid binding agent does not go around the lower part of the shaping layer and the resin component is in an uneven state, causing warping and the like upon the sintering. On the other hand, if the concentration of the resin component is low, it is necessary to repeat the application of the liquid binding agent, which slows the lamination speed. In addition, when the amount of the resin component is small, the strength of the laminated body of the resin and the ceramic particle is weakened, and there is a risk that the shaping part is broken upon removing the supporting body. In particular, in a microstructure, it is difficult to remove the supporting body.

An object of the present invention is to produce a three-dimensional object made of a ceramic through additive manufacturing with high accuracy and with high yield.

SUMMARY OF THE INVENTION

The first aspect of the present invention is a method of producing a three-dimensional object through additive manufacturing, characterized by having: repeating multiple times forming a ceramic powder layer including a ceramic powder and applying to a desired region of the ceramic powder layer a liquid precursor composition at least containing at least one of a metal alkoxide, a metal chloride, a hydrolysate of the metal alkoxide and a polycondensate of the hydrolysate, and water, thereby obtaining a laminated body; heating the laminated body at a temperature lower than the sintering temperature of the ceramic powder; and removing the ceramic powder in a region to which the precursor composition has not been applied from the laminated body after the heating.

The second aspect of the present invention is a production apparatus for producing a three-dimensional object through additive manufacturing, characterized by having: a stage on which a three-dimensional object is formed; a unit forming a ceramic powder layer including a ceramic powder on the stage; a unit applying to a desired region of the ceramic powder layer a liquid precursor composition at least containing at least one of a metal alkoxide, a metal chloride, a hydrolysate of the metal alkoxide and a polycondensate of the hydrolysate, and water; a unit heating a laminated body formed by laminating a plurality of the ceramic powder layers to which the precursor composition has been applied; and a unit reversibly changing the relative positions of the unit forming the ceramic powder layer and the unit applying the precursor composition with regard to the stage.

The third aspect of the present invention is a method of producing a three-dimensional object through additive manufacturing, characterized in that forming a precursor composition layer from a liquid precursor composition at least containing at least one of a metal alkoxide, a metal chloride, a hydrolysate of the metal alkoxide and a polycondensate of the hydrolysate, an acidic catalyst promoting hydrolysis of the metal alkoxide, and water, where the proportion of a ceramic formed from the precursor composition to the precursor composition is 1% by mass or more; and drying the precursor composition layer, thereby forming a ceramic layer are repeated multiple times.

Further features of the present invention will become apparent from the following description of exemplary embodiments with reference to the attached drawings.

DESCRIPTION OF THE EMBODIMENTS

Hereinafter, the present invention will be described in detail with reference to embodiments of the present invention. In each of the drawings, the same signs are given to positions indicating the same members or corresponding members.

Technologies well known or publicly known in the art can be applied to a configuration or a step not specifically illustrated or mentioned. In addition, description may be omitted when redundant.

(First Embodiment)

A method of producing a three-dimensional object according to the present embodiment has the following steps:
(I) a step of forming a ceramic powder layer including a ceramic powder;
(II) a step of applying a precursor composition to the ceramic powder layer;
(III) a step of repeating the steps (I) to (II), thereby obtaining a laminated body;
(IV) a step of heating the laminated body; and
(V) a step of removing an unnecessary ceramic powder after heating the laminated body.

Hereinafter, each step will be described using FIG. 1A to FIG. 1G, but the present invention is not limited to the description therefor.

(I) Step of Forming Ceramic Powder Layer

Figure 1A:
FIG. 1A is a schematic cross sectional drawing showing a step of a production method according to a first embodiment of the present invention.

In this step, a ceramic powder layer 11 formed of a ceramic powder is formed depending on the thickness of a slice data for an object to be shaped (three-dimensional model) (FIG. 1A). The slice data for an object to be shaped is obtained by slicing the object to be shaped with a certain interval in the shaping direction, and includes information about the cross sectional shape of the three-dimensional object, the arrangement of materials, and the like.

The thickness of the ceramic powder layer 11 is preferably in the range of 1 μm or more and 2 mm or less, and is more preferably 1 μm or more and 200 μm or less. When the layer thickness is 1 μm or more, the shaping speed tends to be fast because the thickness of one layer upon the shaping is sufficiently thick. In addition, when the layer thickness is 2 mm or less, the surface roughness of a three-dimensional object 14 to be obtained is made to be small.

A powder to be used in the present invention includes a ceramic powder as a main component thereof. The main component here refers to a component accounting for 50 mol % or more of the material composition detected by carrying out component analysis for an arbitrary amount of the powder. The ceramic powder is a powder formed of a ceramic particle, and an existing ceramic particle can be used therefor. In the present invention, a nonmetallic inorganic material is defined as a ceramic. Specifically, an oxide and a nonoxide are each used. Examples of the oxide include metal oxides such as silica, alumina, zirconia, titania, magnesia, cerium oxide, zinc oxide, tin oxide, uranium oxide, barium titanate, barium hexaferrite and mullite. Examples of the nonoxide include silicon nitride, titanium nitride, aluminum nitride, silicon carbide, titanium carbide, tungsten carbide, boron carbide, titanium boride, zirconium boride, lanthanum boride, molybdenum silicide, iron silicide and barium silicide. These ceramic particles may be formed of multiple kinds of ceramics. In addition, the ceramic powder may be those to which an additive other than ceramics is added. In addition, the ceramic powder may include multiple kinds of ceramic particles.

In addition, the ceramic particle may have a porous structure on the surface thereof. When the ceramic particle has a porous structure, upon binding ceramic particles to each other, a consecutive ceramic from the ceramic particle surface to the inside of pores is formed and the binding strength is increased, which is preferable.

The volume average particle diameter of the ceramic powder to be used (hereinafter, may be simply described as the average particle diameter) is preferably in the range of 1 μm or more and 1000 μm or less, and is more preferably 10 μm or more and 200 μm or less. When the average particle diameter is 1 μm or more, the shaping speed tends to be fast because the thickness of one layer of the ceramic powder layer 11 becomes thicker. When the average particle diameter is 1000 μm or less, the surface roughness of the three-dimensional object 14 to be obtained in the end tends to be small, which is preferable.

Measurement of the volume average particle diameter of a ceramic powder can be carried out using a laser diffraction and scattering type particle size distribution measuring apparatus "LA-950" (manufactured by HORIBA, Ltd.). For setting the measurement conditions and analyzing the measuring data, attached, designated software is used. In a specific measuring method, at first, a batch cell in which a measuring solvent is placed is set on a laser diffraction and scattering type particle size distribution measuring apparatus "LA-950" (manufactured by HORIBA, Ltd.), and adjustment of the optical axis and the adjustment of the background are carried out. Here, it is necessary that the solvent to be used be selected from those in which a ceramic powder to be measured is not dissolved. In addition, in order to improve dispersion of ceramic particles to be measured, a dispersing agent may be appropriately added into the solvent as necessary. A ceramic powder, which is an object to be measured, is added to the batch cell until the transmittance of a tungsten lamp becomes 95% to 90%, and measurement of the particle size distribution is carried out. From the obtained measurement results, the average particle diameter based on the volume can be calculated.

For the ceramic powder to be used, it is preferable that multiple ceramic powders having average particle diameters different from each other be mixed and used. In particular, it is preferable that a ceramic particle with a small particle diameter be present such that the voids formed by a ceramic powder having a volume average particle diameter within the above range are filled. When such a ceramic particle with a small particle diameter is present, voids in the ceramic powder layer 11 are reduced, and as a result, the three-dimensional object 14 with a small void ratio can be obtained.

In addition, in the ceramic particle, the average circularity of a cross section of the putative surface is preferably 0.94 or more, and is more preferably 0.96 or more. When the average circularity of a cross section of the putative surface of the ceramic particle is 0.94 or more, the ceramic particle has a structure close to a sphere and ceramic particles are in point contact with each other. Accordingly, in the powder including ceramic particles according to the present invention, flowability is likely to be maintained and the particles tends to be packed in the closest manner in the ceramic powder layer 11, and therefore, the ceramic powder layer 11 with few voids is formed easily.

The circularity of the ceramic particle can be measured as follows, and the average circularity can be obtained by calculating the average of circularities obtained by measuring arbitrary 10 or more ceramic particles.

Circularity=(the circumference of a circle having the same area as the projected area of the putative surface of the ceramic particle)/(the circumference of the projection image of the putative surface of the ceramic particle)

Here, "the projected area of the putative surface of the ceramic particle" is the area of the binarized projection image of the putative surface of the particle, and "the circumference of the projection image of the putative surface of the ceramic particle" is defined to be the length of a profile line obtained by linking the edge points of the projection image of the putative surface of the ceramic particle. The circularity is an indicator representing the complexity of the shape of the ceramic particle, and it represents 1.00 when the ceramic particle is a perfect sphere. The farther the shape of the projection image of the putative surface of the ceramic particle goes off from a circle, the smaller the value of the circularity becomes. Note that the circularity of the ceramic particle can be measured through image processing for images observed with an electron microscope or the like, and by using a flow type particle image measuring apparatus ("FPIA-3000 model" manufactured by Toa Medical Electronics Co., Ltd.).

The ceramic powder layer 11 may be appropriately pressurized. By pressurizing the ceramic powder layer 11, the number of contact points between ceramic particles is increased, and there is a tendency that defects are unlikely to be formed in the three-dimensional object 14 to be obtained in the end. In addition, it is believed that, due to the pressurization, ceramic particles in the ceramic powder layer 11 become denser and ceramic particles are not likely to move upon applying a precursor composition or upon heating, which will be mentioned later, and the shape tends to be maintained.

(II) Step of Applying Precursor Composition to Ceramic Powder Layer

Figure 1B:
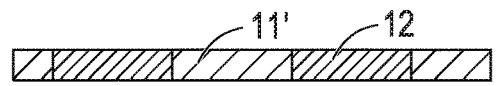
FIG. 1B is a schematic cross sectional drawing showing a step of the production method according to the first embodiment of the present invention.

To a region 12 of the ceramic powder layer 11 formed in step (I) depending on the slice data for the object to be shaped, a precursor composition is applied (FIG. 1B). Here, the region 12 to which the precursor composition has been applied is a shaping part constituting a three-dimensional object (shaped object) 14 in the end, and a region 11' to which the precursor composition has not been applied is a non-shaping part to be removed.

In the present invention, the ceramic powder is bound with a metal oxide formed through hydrolysis and polycondensation reaction of a metal alkoxide or with a ceramic formed through so-called sol-gel method, that is, ceramic particles are bound therebetween to carry out shaping. A metal alkoxide is obtained from a metal chloride, and therefore, even when a metal chloride is used as a starting raw material instead of a metal alkoxide, a ceramic can be produced through sol-gel method.

Therefore, in the present invention, either metal chloride or metal alkoxide may be used as a starting raw material, or both may be mixed and used. From the viewpoint of stability in the production process, a metal alkoxide is preferable.

The precursor composition to be used in the present invention is prepared to have any of the composition at least including a metal alkoxide and water, the composition at least including a metal chloride and water, and the composition obtained by mixing these compositions. However, generation of a metal alkoxide from a metal chloride, as well as hydrolysis and polycondensation reaction of such a metal alkoxide, progresses over time immediately after the preparation of the precursor composition. Therefore, the precursor composition of the present invention at least contains at least one of a metal alkoxide, a metal chloride, a hydrolysate of the metal alkoxide and a polycondensate of the hydrolysate, and water.

In the present invention, a metal oxide is basically formed through hydrolysis and polycondensation reaction of a metal alkoxide. As such, even when the concentration of a metal alkoxide or metal chloride in the precursor composition is increased, a rise in viscosity is small, and controlling the viscosity of the precursor composition and controlling the solid concentration thereof can be achieved at the same time.

Examples of the metal alkoxide include, for example, alkoxides of silicon. Specifically, examples thereof include, but are not limited to, organic metal alkoxides such as tetramethoxysilane, tetraethoxysilane, tetra-n-propoxysilane, tetraisopropoxysilane, tetra-n-butoxysilane and tetraisobutoxysilane. In addition, alkoxides of aluminum are also preferably used, and examples thereof include alkoxides similar to those of silicon described above. Examples of the metal chloride include, but are not limited to, for example, titanium tetrachloride and zirconium oxychloride.

The above metal alkoxide and metal chloride may be used in combination, and may be a combined metal compound containing two or more kinds of component metals.

In the present invention, the composition of a ceramic formed from a metal alkoxide or metal chloride, which is a starting raw material, is preferably contained in the ceramic particle constituting the ceramic powder layer 11 formed in step (I), and is more preferably the same as that of the ceramic particle. If the ceramic particle has the same composition as that of the ceramic formed from a metal chloride or metal alkoxide, when the precursor composition is turned into a ceramic, that ceramic is easily bound to the surface of the ceramic particle. As a result, when the precursor composition is turned into a ceramic, that ceramic can bind ceramic particles to each other, allowing a firm three-dimensional object to be obtained. For example, when the ceramic particle is formed of silicon oxide (silica), it is desirable to use an alkoxide of silicon as the metal alkoxide.

In addition, by adding a catalyst that promotes hydrolysis of the metal alkoxide to the precursor composition, a ceramic can be efficiently formed. Specifically, either acidic catalyst or basic catalyst may be used, hydrochloric acid and acetic acid can be used as the acidic catalyst and ammonia can be used as the basic catalyst. Note that, when a metal chloride is used as a starting raw material, by using an alcohol in combination, hydrogen chloride (hydrochloric acid) is generated from reaction between the metal chloride and the alcohol and such hydrogen chloride can be used as the acidic catalyst. Furthermore, the above acidic catalyst may be added separately.

The precursor composition may have the same composition for every ceramic powder layer 11, or may have different compositions. In addition, to the same ceramic powder layer 11, only one kind of precursor composition may be applied, or multiple kinds of precursor compositions may be applied.

The concentration of the precursor composition and the amount thereof to be applied affects the void ratio of a three-dimensional object, and therefore, these are appropriately adjusted depending on desired voids of the three-dimensional object.

In the present invention, the precursor composition needs to contain water for hydrolysis of the metal alkoxide, and pure water is preferably used.

To the precursor composition according to the present invention, an organic solvent may be added in order to increase the layer homogeneity of the metal alkoxide. Specifically, alcohols such as methanol, ethanol and isopropyl alcohol (IPA), ketones such as methyl ethyl ketone, acetone and acetylacetone, and hydrocarbons such as hexane and cyclohexane are used. These organic solvents evaporate at an appropriate speed after applying the precursor composition to the ceramic powder layer 11, and therefore, a homogeneous ceramic is likely to be obtained, which is preferable.

In addition, when a metal chloride is used as a starting raw material, an alcohol may be added and used in order to form a metal alkoxide. Specifically, the alcohol is selected depending on the kind of the metal chloride, and for example, 2-propanol is used for titanium tetrachloride.

In addition, an additive may be appropriately added in order to control the dispersibility of a metal alkoxide or metal chloride.

In addition, the proportion of a ceramic formed from the precursor composition to such precursor composition is preferably 0.1% by mass or more, more preferably 5% by mass or more, and further preferably 10% by mass or more. When such a proportion is 0.1% by mass or more, voids can be reduced upon forming a ceramic from the precursor composition, allowing a denser shaped object to be obtained.

The precursor composition according to the present invention can be obtained by adding a metal alkoxide or metal chloride into a solution and stirring the solution. In addition, in order to moderately advance reaction of a metal alkoxide in the precursor composition, the precursor composition may also be heated as necessary.

In the present invention, it is preferable that, after applying the precursor composition to the ceramic powder layer 11, the region 12 to which such precursor composition has been applied be dried. By drying the precursor composition on the ceramic powder, the concentrated precursor composition is cumulated in the grain boundary between ceramic particles due to the surface tension, thereby accumulating a ceramic formed from a metal alkoxide in the grain boundary and firmly binding ceramic particles. The drying speed or a drying unit can be arbitrary changed depending on the type or concentration of the precursor composition.

The precursor composition according to the present invention is preferably a sol containing a polycondensate formed through hydrolysis and polycondensation reaction of the metal alkoxide. Such a polycondensate has a high activity, and therefore, ceramic particles can be bound using such a polycondensate as a base point.

In the precursor composition of the present invention, when a metal chloride is used as a starting raw material, generation of a metal alkoxide, as well as hydrolysis and polycondensation reaction of such a metal alkoxide, begins immediately after the preparation. In addition, when a metal alkoxide is used as a starting raw material, hydrolysis and polycondensation reaction of such a metal alkoxide begins. Therefore, the longer it takes after the preparation of the precursor composition until using it, the more the amount of the hydrolysate and polycondensate contained therein is increased, and the precursor composition is gelated in the end. Therefore, it is desirable to adjust the length of time from the preparation of the precursor composition until forming a precursor composition layer, considering the speed of hydrolysis and polycondensation reaction and the concentration of polycondensate included in the precursor composition at a time point of forming a precursor composition layer.

In addition, the precursor composition according to the present invention may contain a colorant as necessary.

In the present invention, as a method of applying the precursor composition to a desired region on a ceramic powder layer 11, a method of ejecting the precursor composition to draw and the like can be used, and any general approaches can be used. In particular, the ejection with an ink jet is preferable in that the liquid volume and the position of arrangement can be controlled.

When the precursor composition is ejected with an ink jet, the viscosity thereof is preferably 20 cP (0.02 Pa•s) or less, and is more preferably 10 cP (0.01 Pa•s) or less. When the viscosity is 20 cP or less, the ejection of the precursor composition is easily controlled. Moreover, upon applying it to the ceramic powder layer 11, the precursor composition soaks into the lower layer of the ceramic layer 11, and the precursor composition is unlikely to be distributed unevenly on the surface layer of the ceramic layer 11.

In addition, in the present invention, to a non-shaping part 11' of the ceramic powder layer 11 to which the precursor composition has not been applied, a binding agent that is different from the precursor composition may be applied to immobilize the ceramic powder in the non-shaping part 11'. Specifically, examples of the binding agent include a resin solution formed by dissolving a resin to be degraded at a heating temperature for a laminated body 13, which will be mentioned later, in a solvent. The resin is degraded upon heating the laminated body 13, and therefore, the non-shaping part can be readily removed from the laminated body 13 after the heating. Note that such a binding agent may be applied to the shaping part 12 to which the precursor composition is applied, but the binding agent may remain in a three-dimensional object 14 after the heating as a impurity, and therefore, it is necessary to pay attention to the kind and the amount of a material to be used.

(III) Step of Repeating Steps (I) to (II), Thereby Obtaining Laminated Body

Figure 1C:
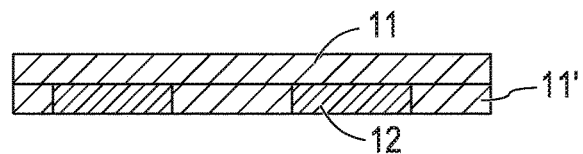
FIG. 1C is a schematic cross sectional drawing showing a step of the production method according to the first embodiment of the present invention.
Figure 1D:
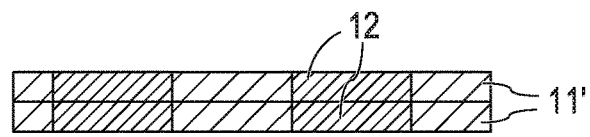
FIG. 1D is a schematic cross sectional drawing showing a step of the production method according to the first embodiment of the present invention.
Figure 1E:
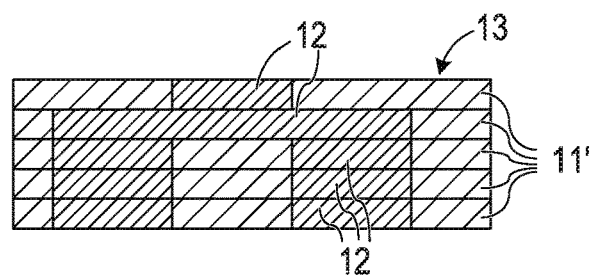
FIG. 1E is a schematic cross sectional drawing showing a step of the production method according to the first embodiment of the present invention.

On the ceramic powder layer of the first level to which the precursor composition has been applied in FIG. 1B, a ceramic powder layer 11 of the second level is formed according to the above step (I) (FIG. 1C). Subsequently, according to step (II), the precursor composition is applied to a shaping part 12 of the ceramic powder layer 11 of the second level (FIG. 1D). As stated above, by repeating steps (I) to (II) multiple times, a laminated body 13 in which the precursor composition has been applied to a desired region 12 is obtained (FIG. 1E). The laminated body 13 may be pressurized from the top. Due to the pressurization, the number of contact points between ceramic particles is increased, and sintering between ceramic particles upon the heating, which will be mentioned later, progresses efficiently.

(IV) Step of Heating Laminated Body

Figure 1F:
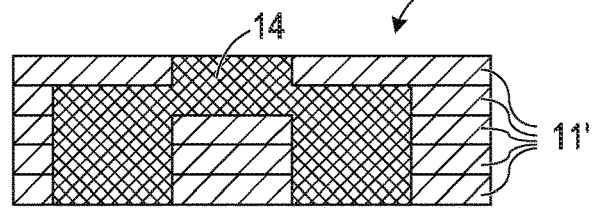
FIG. 1F is a schematic cross sectional drawing showing a step of the production method according to the first embodiment of the present invention.

By heating a laminated body 13 obtained in the above step (III), a three-dimensional object 14 in which ceramic particles of a shaping part 12 have been bound is obtained (FIG. 1F). Note that, when a binding agent has been applied to a non-shaping part 11' in step (III), the binding agent is degraded in such a heating step.

The temperature at which the laminated body 13 is heated is the temperature in the above steps (I) to (III) or higher, and is a temperature lower than the sintering temperature of the ceramic powder. In the present invention, "the sintering temperature of the ceramic powder" is a temperature at which, upon heating ceramic particles for 60 minutes in a state where ceramic particles are in contact with each other, such ceramic particles are bound to each other, and at a temperature lower than that, binding of such ceramic particles cannot be confirmed although ceramic particles are heated for 60 minutes.

The sintering temperature of the ceramic powder can be determined according to the following approaches (1) to (3):

(1) a powder, the sintering temperature of which is to be determined, is packed in an alumina container with a diameter of 5 mm and a height of 2.5 mm until the bottom is covered;

(2) the above alumina container is heated in an electric furnace for 60 minutes at a temperature that is believed to be low enough, from the composition of the powder material, for particles not to be sintered, and the state of the powder is observed; and (3) if the sintering of the powder is not confirmed, under conditions of raising the heating temperature by 10° C., heating is carried out in the same manner and the observation is repeated, and a temperature at which the sintering of the powder is confirmed for the first time is defined to be the sintering temperature of the powder. The width by which the temperature is raised when the powder is not sintered is not limited to 10° C., and by making the width by which the temperature is raised smaller as necessary, a more accurate sintering temperature can be determined.

Whether the powder has been sintered or not is determined by specifying with an electron microscope, before the heat treatment, a field of view with a magnification by which two or more particles having a particle diameter close to the average particle diameter included in the powder generally fall within the field of view, and by observing particles included in the powder after the heat treatment by the above magnification at 30 or more locations. If, in the observation field of view for a half or more of the observation locations, particles having a particle diameter close to the average particle diameter (the average particle diameter or less) are bound and particles are fixed (bound) such that the boundary of original particles cannot be observed, the powder is considered to be sintered.

(V) Step of Removing Unnecessary Ceramic Powder After Heating Laminated Body

Figure 1G:
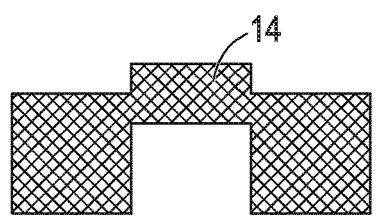
FIG. 1G is a schematic cross sectional drawing showing a step of the production method according to the first embodiment of the present invention.

Subsequently, by removing ceramic powder particles of a non-shaping part 11' from a laminated body 13, a three-dimensional object 14 is taken out (FIG. 1G). Taken out the three-dimensional object 14 may be subjected to a postprocessing such as polishing, as necessary.

In the present invention, the laminated body is heated at a temperature lower than such a sintering temperature, and therefore, ceramic particles are not sintered therebetween. On the other hand, hydrolysis and polycondensation reaction of a metal alkoxide in the precursor composition that intervenes between ceramic particles progress further due to the heating, and the precursor composition is turned into a ceramic. Therefore, ceramic particles of a shaping part 12 are bound to each other via the ceramic generated from the metal alkoxide and immobilized, thereby providing the three-dimensional object 14.

The ceramic formed from a metal alkoxide is in a state with a high activity, and therefore, upon forming the ceramic by the heating, the ceramic can be bound to the surface of ceramic particles, thereby fixing ceramic particles more firmly. Furthermore, because the ceramic derived from the metal alkoxide is present in the grain boundary between ceramic particles and the number of points at which ceramic particles are in contact with each other is increased, the sintering of ceramic particles progress from a temperature lower than the sintering temperature of the powder formed of ceramic particles alone. As a result, a dense, ceramic shaped object can be formed.

In the production method of the present invention, a three-dimensional object is made by heating the entire laminated body in which ceramic particles of a shaping part 12 are in a state of being supported by ceramic particles of a non-shaping part 11', and turning the precursor composition that has been applied to the shaping part 12 into a ceramic, thereby immobilizing ceramic particles. Therefore, while the shaping part 12 is in a state where shape change such as warping is suppressed, the density of the ceramic can be raised, the shaping part can be crystallized, or the crystallinity thereof can be enhanced.

As a method of removing ceramic particles of the non-shaping part 11' from the laminated body 13 after the heating, publicly known methods can be used, and furthermore, the removed ceramic particles may be collected and used again as a shaping material.

In obtained the three-dimensional object 14, by heating the three-dimensional object at a temperature further higher than the above heating temperature, the ceramic constituting the three-dimensional object 14 can be crystallized, the crystallinity thereof can be enhanced, or the density thereof can be enhanced, thereby improving the properties of the three-dimensional object.

The ceramic formed from a metal alkoxide in the precursor composition has a higher activity than that of general ceramics formed under high temperature, and the sintering of ceramic particles readily progresses using such a ceramic as a base point. In addition, a three-dimensional object to be obtained in the present invention is formed of a ceramic, and the composition thereof is not altered largely due to the deresination and the like upon the sintering. Therefore, even when the three-dimensional object is further sintered, the properties thereof can be improved while suppressing the shape change.

A large characteristic of the present invention is that, in the shaping part 12, a ceramic can be formed from the precursor composition at the sintering temperature of the ceramic powder or lower, and therefore, ceramic particles of the shaping part 12 can be selectively immobilized. Furthermore, overall uniform heating is possible upon the heat treatment, and therefore, an impact due to local temperature difference is reduced, and even in the case of ceramics, cracks are reduced upon forming a shaped object. In addition, unlike an approach of sintering the shaping part 12 as a composite of a ceramic particle and a resin, since the non-shaping part 11' is removed after sintering the three-dimensional object 14, there is no risk that the three-dimensional object 14 is broken during the step of removing the non-shaping part 11'. Furthermore, the shaping part 12 is not fixed with a resin, and therefore, there is no limitation on the size considering the deresination, and contamination of impurities into the three-dimensional object 14 due to the resin is small. As such, according to the present invention, even in the case of an overhang structure or a complicated shape, there is no limitation on the size and shape, and a three-dimensional object can be readily made.

Figure 2:
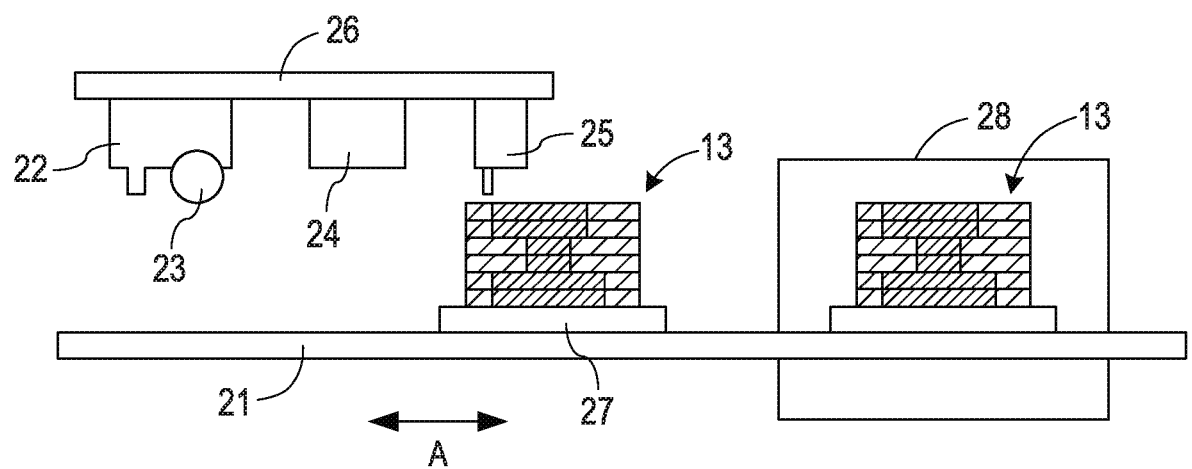
FIG. 2 is an outline drawing showing a configuration of a production apparatus according to the first embodiment of the present invention.

Next, a production apparatus by which the production method of the present invention can be performed will be described. The production apparatus of the present invention has a stage on which a three-dimensional object is formed; a unit forming a ceramic powder layer; a unit applying a precursor composition; a unit heating a laminated body; and a unit reversibly changing the relative positions of the above units with regard to the above stage. For each member, detailed description will be given with reference to FIG. 2. FIG. 2 is an outline drawing schematically showing a configuration of a preferred embodiment of the production apparatus of the present invention.

The apparatus of FIG. 2 is provided with a stage 21 for forming a three-dimensional object; a particulate supplying part 22 as a unit forming a ceramic powder layer; a liquid supplying part 25 as a unit applying a precursor composition; and a heating apparatus 28 as a heating unit. In the apparatus of FIG. 2, the particulate supplying part 22 and the liquid supplying part 25 are attached to a substrate 26, and by reversibly conveying the stage 21 in a direction of arrow A with regard to the substrate 26, the relative position of the stage 21 with regard to the substrate 26 is changed.

On the stage, a base substrate 27 is arranged, and on the base substrate 27, a three-dimensional object is formed. On the base substrate 27, depending on the thickness of a slice data for a target three-dimensional object, ceramic particles are supplied from the particulate supplying part 22, and a ceramic powder layer with a certain thickness is formed. In the apparatus of FIG. 2, a particulate controlling member 23 is arranged at a stage subsequent to the particulate supplying part 22, and while pressurizing the ceramic powder layer on the base substrate 27 with the particulate controlling member 23, the layer thickness is controlled.

To a desired region of a ceramic powder layer on the base substrate 27, a precursor composition is applied from the liquid supplying part 25. As the liquid supplying part 25, an ejecting unit based on the ink jet system is preferably used. In addition, in the apparatus of FIG. 2, a heating unit 24 is arranged at a stage prior to the liquid supplying part 25, and by heating the ceramic powder layer with the heating unit 24, hydrolysis and polycondensation reaction in the precursor composition supplied from the liquid supplying part 25 in the subsequent stage can be promoted.

By moving the stage 21 back and forth in the direction of arrow A while moving down the stage for every layer, formation of the above ceramic powder layer, pressurization, heating, and application of the precursor composition are repeated, and the laminated body 13 formed by laminating a plurality of the ceramic powder layers is obtained. Subsequently, the stage 21 is moved forward, and the laminated body 13 is heated by the heating apparatus 28 and ceramic particles of the region to which the precursor composition has been applied are bound and integrated. Thereafter, after cooling the laminated body taken out of the heating apparatus 28, by removing ceramic particles of a region to which the precursor composition has not been applied, the target three-dimensional object is obtained.

Note that, in the apparatus of FIG. 2, after applying the precursor composition to the ceramic powder layer, the precursor composition may be dried by leaving the precursor composition at rest for one minute for every layer. Furthermore, after removing ceramic particles of the non-shaping part from the laminated body 13 taken out of the heating apparatus 28, the three-dimensional object may be carried into the heating apparatus 28 again to sinter the three-dimensional object at the sintering temperature of the ceramic powder. Due to such a sintering step, voids in the three-dimensional object are reduced, and the mechanical strength of the three-dimensional object is improved.

(Second Embodiment)

The second embodiment is different from the first embodiment in that the ceramic powder layer is not formed and in that the precursor composition to be used for the shaping contains an acidic catalyst that promotes hydrolysis of the above metal alkoxide.

In the present embodiment, a shaped object is produced by repeating multiple times a step of forming a precursor composition layer formed of a precursor composition and drying that layer to form a ceramic layer. In addition, the precursor composition of the present invention is in a liquid state containing at least one of a metal alkoxide, a metal chloride, a hydrolysate of the metal alkoxide and a polycondensate of the hydrolysate, an acidic catalyst that promotes hydrolysis of the metal alkoxide, and water. At first, the principle by which a ceramic is obtained from a metal alkoxide in the present invention will be described.

When water is added to a metal alkoxide to carry out hydrolysis of the metal alkoxide, a sol (colloidal solution) containing a hydrolysate and a polycondensate formed through polycondensation reaction of such a hydrolysate is obtained, and when the reaction is further promoted, a gel in which the flowability has been lost is obtained. Then, when this gel is dried, the polycondensation reaction further progresses, and water and a solvent included in the gel evaporate, thereby providing a ceramic formed of a metal oxide. Therefore, in the present invention, a ceramic can be formed without undergoing a sintering step at a high temperature. Note that a method of forming ceramics through such a step is generally called sol-gel method.

The hydrolysis reaction of a metal alkoxide is promoted by adding an acidic catalyst or a basic catalyst, but the state of a gel or the speed varies depending on which catalyst is added.

When the hydrolysis reaction of a metal alkoxide is carried out adding an acidic catalyst, the hydrolysis reaction of the metal alkoxide occurs due to electrophilic reaction caused by the acidic catalyst. When the hydrolysis reaction begins, the polycondensation reaction also begins, and the polycondensation reaction progresses sequentially, and therefore, the polycondensation reaction progresses linearly. Accordingly, when an acidic catalyst is used, a sol having a linear polycondensate is likely to be formed, and when such a sol is gelated, linear polycondensates are entangled with each other to form a three-dimensional network structure. Therefore, it is believed that, upon drying the gel, the degree of freedom is high because the polycondensate is in the form of a fine linear chain, and as a result, the stress is dispersed and cracks are suppressed.

On the other hand, when the hydrolysis reaction of a metal alkoxide is carried out adding a basic catalyst, the hydrolysis reaction of the metal alkoxide occurs due to nucleophilic reaction caused by the basic catalyst. Upon this, the basic catalyst directly attacks the central metal atom, but the reaction is suppressed due to steric hindrance. However, when the reaction progresses probabilistically, the steric hindrance is reduced in the moiety of OH group generated through the reaction. As a result, once the reaction progresses, most of the reaction points that the metal atom has are substituted with OH groups. In the case of a basic catalyst as well, when the hydrolysis reaction begins, the polycondensation reaction also begins, but the polycondensation reaction is initiated after almost all of the reaction points that the metal atom has are substituted with OH groups, and therefore, the polycondensation reaction progresses three-dimensionally. As a result, a gel with a high three-dimensionality and density is obtained, and upon drying the gel, cracks are likely to occur due to the stress generated in the gel.

A metal alkoxide is obtained from a metal chloride, and therefore, even when a metal chloride is used as a starting raw material instead of a metal alkoxide, a ceramic in which cracks are similarly reduced can be produced through the sol-gel method. Note that, when a metal alkoxide is obtained from a metal chloride, by using an alcohol in combination, hydrogen chloride is generated from reaction between the metal chloride and the alcohol and such hydrogen chloride can be used as the acidic catalyst.

Therefore, either metal chloride or metal alkoxide may be used as a starting raw material, or both may be mixed and used. From the viewpoint of stability in the production process, a metal alkoxide is preferable.

From the above, the precursor composition of the present embodiment is prepared to have any of the composition at least including a metal alkoxide, an acidic catalyst that promotes hydrolysis of the metal alkoxide, and water, the composition at least including a metal chloride, water, and an acidic catalyst that promotes hydrolysis of the metal alkoxide, and the composition obtained by mixing these compositions. Generation of a metal alkoxide from a metal chloride, as well as hydrolysis and polycondensation reaction of such a metal alkoxide progresses over time immediately after the preparation of the precursor composition. Therefore, the precursor composition of the present invention at least contains at least one of a metal alkoxide, a metal chloride, a hydrolysate of the metal alkoxide and a polycondensate of the hydrolysate, an acidic catalyst that promotes hydrolysis of the metal alkoxide, and water.

Examples of the metal alkoxide include, for example, alkoxides of silicon. Specifically, examples thereof include, but are not limited to, tetramethoxysilane, tetraethoxysilane, tetra-n-propoxysilane, tetraisopropoxysilane, tetra-n-butoxysilane and tetraisobutoxysilane. In addition, alkoxides of aluminum are also preferably used, and examples thereof include alkoxides similar to those of silicon described above.

Examples of the metal chloride include, but are not limited to, for example, titanium tetrachloride and zirconium oxychloride.

The above metal alkoxide and metal chloride may be a combined metal compound containing two or more kinds of component metals.

Examples of the acidic catalyst are not particularly limited as long as the catalyst is an acidic catalyst, but specifically, hydrochloric acid or acetic acid can be used. In addition, as described above, when a metal chloride is used as a starting raw material, by using an alcohol in combination, hydrogen chloride (hydrochloric acid) generated from reaction between the metal chloride and the alcohol can be used as the acidic catalyst. Furthermore, the above acidic catalyst may be added separately.

In the present invention, the precursor composition needs to contain water for hydrolysis of the metal alkoxide, and pure water is preferably used.

To the precursor composition, an organic solvent may be added in order to improve the homogeneity in the composition of the layer formed of the metal alkoxide. As such an organic solvent, specifically, alcohols such as methanol, ethanol and isopropyl alcohol (IPA), ketones such as methyl ethyl ketone, acetone and acetylacetone, and hydrocarbons such as hexane and cyclohexane are used. These organic solvents evaporate at an appropriate speed in a drying step for a precursor composition layer, which will be mentioned later, and therefore, a homogeneous ceramic layer is likely to be obtained, which is preferable.

In addition, when a metal chloride is used as a starting raw material, an alcohol may be added and used in order to form a metal alkoxide. Specifically, the alcohol is selected depending on the kind of the metal chloride, and for example, 2-propanol is used for titanium tetrachloride.

The precursor composition is preferably a sol containing a polycondensate formed through hydrolysis and polycondensation reaction of the metal alkoxide. When the precursor composition is a sol, upon drying a precursor composition layer, the stress is likely to be dispersed due to the polycondensate that is present in advance, and cracks are not likely to occur.

In the precursor composition, when a metal chloride is used as a starting raw material, generation of a metal alkoxide, as well as hydrolysis and polycondensation reaction of such a metal alkoxide, begins immediately after the preparation. In addition, when a metal alkoxide is used as a starting raw material, hydrolysis and polycondensation reaction of such a metal alkoxide begins. Therefore, the longer it takes after the preparation of the precursor composition until using it, the more the amount of the hydrolysate and polycondensate contained therein is increased, and the precursor composition is gelated in the end. Therefore, it is desirable to adjust the length of time from the preparation of the precursor composition until forming a precursor composition layer, considering the speed of hydrolysis and polycondensation reaction and the concentration of polycondensate included in the precursor composition at a time point of forming a precursor composition layer.

The precursor composition may further contain an inorganic particle. When the precursor composition contains an inorganic particle, the solid content of the precursor composition is increased, and the thickness of a ceramic layer that can be formed in one time can be increased. Furthermore, when inorganic particles are dispersed in a precursor composition layer, the stress occurring upon drying the precursor composition can be dispersed and the occurrence of cracks can be suppressed. If such an inorganic particle is not added, it may be necessary to minutely control lamination conditions depending on the kind of the metal alkoxide, the concentration thereof, and the thickness of a ceramic layer.

The inorganic particle is preferably a metal oxide. Among others, silicon oxide is preferable, and in addition, oxide inorganic materials such as aluminum oxide, titanium oxide and zirconium oxide can be used. In addition, it is preferable that the metal element of the above metal oxide be the same as the metal element included in a metal alkoxide or metal chloride, which is a starting raw material. For example, when the metal contained in the metal alkoxide or metal chloride is silicon, silicon oxide can be suitably used as the inorganic particle. When an inorganic particle to be added and a ceramic formed from a metal chloride or metal alkoxide have the same composition, the polycondensate and the inorganic particle can be bound more firmly upon drying a precursor composition layer, and a firm ceramic layer is formed, which is preferable.

It is preferable that the inorganic particle have a porous structure on the surface thereof. In this case, the polycondensate is also bound to the inside of pores on the surface of the inorganic particle upon drying the precursor composition layer, and therefore, not only the adherence area between the inorganic particle and the polycondensate is increased, but also the polycondensate is consecutively solidified inside and outside of pores, thereby increasing the binding strength.

When the inorganic particle is added and when the precursor composition is the above sol, if the inorganic particle is larger than the polycondensate included in such a precursor composition, the polycondensate intervenes in gaps between inorganic particles and a ceramic layer having a high density is likely to be formed, which is preferable.

Specifically, the volume average particle diameter of the inorganic particle (inorganic particle powder) is preferably in the range of 0.05 μm or more and 200 μm or less, and is more preferably 1 μm or more and 80 μm or less. When the volume average particle diameter of the inorganic particle is 1 μm or more, the shaping speed tends to be fast because the thickness of one layer of the ceramic layer that can be shaped becomes thicker. In addition, when the volume average particle diameter of the inorganic particle is 200 μm or less, the surface roughness of the ceramic layer can be suppressed to be small.

Measurement of the volume average particle diameter of the inorganic particle can be carried out using a laser diffraction and scattering type particle size distribution measuring apparatus "LA-950" (manufactured by HORIBA, Ltd.). For setting the measurement conditions and analyzing the measuring data, attached, designated software is used. In a specific measuring method, at first, a batch cell in which a measuring solvent is placed is set on a laser diffraction and scattering type particle size distribution measuring apparatus "LA-950" (manufactured by HORIBA, Ltd.), and adjustment of the optical axis and the adjustment of the background are carried out. Here, it is necessary that the solvent to be used be selected from those in which the inorganic particle to be measured is not dissolved. In addition, in order to improve dispersion of the inorganic particle to be measured, a dispersing agent may be appropriately added into the solvent as necessary. An inorganic particle powder, which is an object to be measured, is added to the batch cell until the transmittance of a tungsten lamp becomes 95% to 90%, and measurement of the particle size distribution is carried out. From the obtained measurement results, the average particle diameter based on the volume can be calculated.

In addition, in the inorganic particle, the average circularity of a cross section of the putative surface is preferably 0.94 or more, and is more preferably 0.96 or more. When the average circularity of a cross section of the putative surface of the inorganic particle is 0.94 or more, the inorganic particle has a structure close to a sphere. Accordingly, inorganic particles are in point contact with each other, flowability is likely to be maintained, and the particles tends to be closely packed in the precursor composition layer, and therefore, a ceramic layer with few voids is formed easily.

The circularity of the inorganic particle can be measured as follows, and the average circularity can be obtained by calculating the average of circularities obtained by measuring arbitrary 10 or more shaping particles.

Circularity=(the circumference of a circle having the same area as the projected area of the putative surface of the particle)/(the circumference of the projection image of the putative surface of the particle)

Here, "the projected area of the putative surface of the particle" is the area of the binarized projection image of the putative surface of the particle, and "the circumference of the projection image of the putative surface of the particle" is defined to be the length of a profile line obtained by linking the edge points of the projection image of the putative surface of the particle. The circularity is an indicator representing the complexity of the shape of the inorganic particle, and it represents 1.00 when the inorganic particle is a perfect sphere. The farther the shape of the projection image of the putative surface of the inorganic particle goes off from a circle, the smaller the value of the circularity becomes. Note that the circularity of the inorganic particle can be measured through image processing for images observed with an electron microscope or the like, and by using a flow type particle image measuring apparatus ("FPIA-3000 model" manufactured by Toa Medical Electronics Co., Ltd.).

In addition, the precursor composition may contain a colorant as necessary.

In addition, the solid concentration of the precursor composition of the present invention is preferably 5% by mass or more, more preferably 10% by mass or more, and further preferably 25% by mass or more. When the solid concentration is less than 5% by mass, the thickness per layer of the ceramic layer to be obtained becomes small, and limitation can occur on the shaping speed for a three-dimensional object.

In addition, the concentration of solid components in the precursor composition excluding the inorganic particle is preferably 50% by mass or less and is further preferably 30% by mass or less. When the concentration exceeds 50% by mass, upon forming a ceramic layer with a large area, cracks are likely to occur, and limitation can occur on the size of a three-dimensional object.

In the present invention, depending on the slice data for the object to be shaped, the precursor composition is applied to a desired region, thereby forming a precursor composition layer. After the application of the precursor composition, the precursor composition layer according to the present invention is gelated over the course of drying, and the polycondensation reaction progresses as the drying progresses. At the same time, water and an organic solvent evaporate, and a ceramic layer is obtained. Note that, in order to promote the polycondensation reaction in the precursor composition, the precursor composition may be heated as necessary.

The precursor composition layer can be formed by using a method of ejecting the precursor composition to draw and the like, and any general approaches can be used. The ejection with an ink jet is preferable in that the liquid volume and the position of arrangement can be controlled.

In addition, for the thickness of the precursor composition layer, it is preferable to form the precursor composition layer such that the thickness per layer of the ceramic layer after the drying is preferably 0.05 μm or more and 1 mm or less, and is more preferably 1 μm or more and 200 μm or less. For efficiently laminating ceramic layers, the thickness per layer of the ceramic layer is preferably 0.05 μm or more, and in addition, for keeping the surface roughness low, the thickness is preferably 1 mm or less.

In the present invention, one kind of the precursor composition may be used, or two or more kinds of precursor compositions may be mixed for use in combination. When two or more kinds are used, the thickness of a ceramic layer obtained with each precursor composition is appropriately determined depending on the shaping accuracy.

In the present invention, formation of the precursor composition layer may be carried out by forming the layer on a different body for every layer, transferring the layer onto the substrate, drying the layer and laminating layers, or by forming the first layer on the substrate from an intermediate thereof, and for the second layer onward, forming the layer directly on the ceramic layer that has been formed previously. Upon transferring the precursor composition layer from a different body, publicly known transference methods can be used, such as transference utilizing the difference in adhesion force. The drying step may be carried out either at the same time with the lamination or after the lamination, or may be carried out at multiple timings among them. In the precursor composition layer, the polycondensation reaction in the precursor composition further progresses due to the drying step, and the precursor composition layer is combined with and bound to the ceramic layer that has been formed previously, and integrated therewith.

The drying time for the precursor composition layer can be arbitrary changed depending on the composition or concentration of the precursor composition, but if the drying time is too short, the polycondensation reaction does not progress sufficiently in the precursor composition layer, and if the drying time is too long, the production efficiency is decreased. Therefore, it is preferable to set the drying time such that the polymerization reaction progresses sufficiently in the range of 60 minutes or less per layer. In the present invention, because hydrolysis is promoted by the acidic catalyst, the drying step can be carried out at room temperature, but if the polycondensation reaction is slow, the precursor composition layer may be dried by appropriately heating the layer.

Figure 3A:
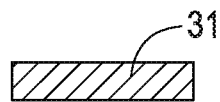
FIG. 3A is a schematic cross sectional drawing showing a step of a production method according to a second embodiment of the present invention.
Figure 3B:
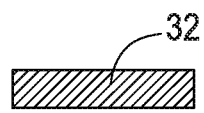
FIG. 3B is a schematic cross sectional drawing showing a step of the production method according to the second embodiment of the present invention.
Figure 3C:
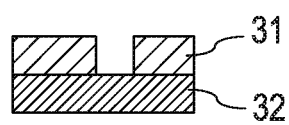
FIG. 3C is a schematic cross sectional drawing showing a step of the production method according to the second embodiment of the present invention.
Figure 3D:
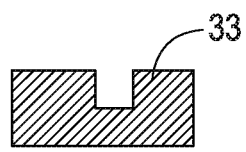
FIG. 3D is a schematic cross sectional drawing showing a step of the production method according to the second embodiment of the present invention.
Figure 3E:
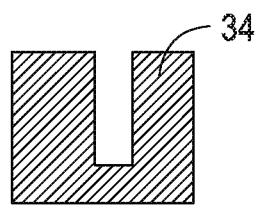
FIG. 3E is a schematic cross sectional drawing showing a step of the production method according to the second embodiment of the present invention.

FIG. 3A to FIG. 3E schematically show one example of the production steps for a three-dimensional object according to the production method of the present embodiment. At first, as shown in FIG. 3A, a precursor composition layer 31 formed of the precursor composition is formed and dried. In the precursor composition layer 31, the polycondensation reaction progresses over the course of drying, and after undergoing gelation, the precursor composition layer becomes a ceramic layer 32 as shown in FIG. 3B. Subsequently, a new precursor composition layer 31 is formed on the ceramic layer 32 (FIG. 3C), and is dried to form the ceramic layer 32. Upon this, ceramic shaped object 33 in which the precursor composition layer 31 of the upper layer has been integrated with a ceramic layer 32 of the lower layer over the course of drying is obtained (FIG. 3D). By repeating the steps of FIG. 3C and FIG. 3D, a three-dimensional object (shaped object) 34, in which a plurality of the ceramic layers has been integrated, is obtained.

In the present invention, when a three-dimensional object is constituted of a ceramic alone, after laminating a plurality of the ceramic layers 32 to provide the three-dimensional object 34, by heating and sintering the three-dimensional object at a high temperature, a firmer three-dimensional object can be obtained.

(Modified Example of Second Embodiment)

According to the shaping method of the second embodiment, a ceramic layer can be formed at a low temperature, and therefore, a composite thereof with a resin material can be produced. Specifically, by repeating a step of forming a ceramic layer using the precursor composition described above in contact with a resin precursor layer or a resin layer, and in the case of using the resin precursor layer, by performing a step of curing such a resin precursor, a composite is obtained. As the resin precursor, a photocurable resin or a thermosetting resin is used, and as the resin, a thermoplastic resin is used. The resin precursor layer or resin layer may be formed in plurality concurrently with the formation step for the ceramic layer, or a step of forming the ceramic layer to the resin precursor layer or resin layer that has been formed in advance may be repeated.

Figure 4A:
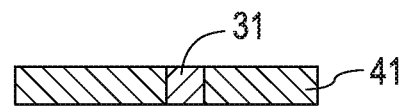
FIG. 4A is a schematic cross sectional drawing showing a step of a method of producing a composite according to the second embodiment of the present invention.
Figure 4B:
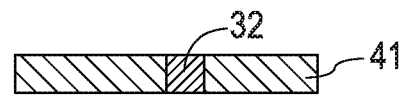
FIG. 4B is a schematic cross sectional drawing showing a step of the method of producing a composite according to the second embodiment of the present invention.
Figure 4C:
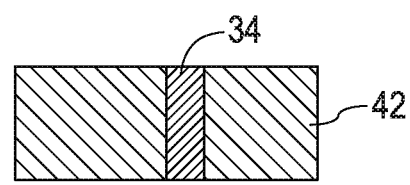
FIG. 4C is a schematic cross sectional drawing showing a step of the method of producing a composite according to the second embodiment of the present invention.

FIG. 4A to FIG. 4C schematically show one example of the production steps for a composite according to the production method of the present invention. At first, as shown in FIG. 4A, a resin precursor layer or resin layer 41 is formed, and a precursor composition layer 31 formed of the precursor composition is formed in contact with the resin layer 41. Subsequently, the precursor composition layer 31 is dried, thereby forming ceramic layer 32 (FIG. 4B). Furthermore, by repeating the steps of FIG. 4A and FIG. 4B, a composite formed of a three-dimensional object 42 formed of the resin and a three-dimensional object 34 formed of the ceramic is obtained. Note that, if the binding force between the resin and the ceramic is weak, the configuration may be made such that one of them includes the other.

EXAMPLES

Hereinafter, Examples of the present invention and Comparative Examples will be shown, but the present invention is not limited to these Examples. At first, Examples and Comparative Examples according to the first embodiment will be shown.

<Preparation of Precursor Composition 1>

After mixing 4.7 g of ethyl silicate (special grade, manufactured by Kishida Chemical Co., Ltd.) and 1.0 g of ethanol (special grade, manufactured by Kishida Chemical Co., Ltd.), the resultant mixture was stirred at room temperature for 4 hours, thereby obtaining solution A. Separately, after mixing 1.2 g of a 0.01 mol/L aqueous hydrochloric acid solution (manufactured by Kishida Chemical Co., Ltd.) and 3.1 g of ethanol (special grade, manufactured by Kishida Chemical Co., Ltd.), the resultant mixture was stirred at room temperature for 4 hours, thereby obtaining solution B. Solution B was added to solution A, and the resultant mixture was stirred for further 24 hours, thereby obtaining precursor composition 1. If the silicon component contained in precursor composition 1 have all become silica, the proportion thereof to precursor composition 1 is 13.6% by mass. In addition, the viscosity of precursor composition 1 was 4.1 cP.

<Preparation of Precursor Composition 2>

After mixing 5.2 g of aluminum sec-butoxide (manufactured by Tokyo Chemical Industry Co., Ltd.), 24.2 g of IPA (special grade, manufactured by Kishida Chemical Co., Ltd.) and 1.4 g of ethyl acetoacetate (special grade, manufactured by Kishida Chemical Co., Ltd.), the resultant mixture was stirred at room temperature for 4 hours, thereby obtaining solution C. Separately, after mixing 0.38 g of a 0.01 mol/L aqueous hydrochloric acid solution and 1.2 g of IPA (special grade, manufactured by Kishida Chemical Co., Ltd.), the resultant mixture was stirred at room temperature for 4 hours, thereby obtaining solution D. Solution D was added to solution C, and the resultant mixture was stirred for further 24 hours, thereby obtaining precursor composition 2.

If the aluminum component contained in precursor composition 2 have all become alumina, the proportion thereof to precursor composition 2 is 3.3% by mass. In addition, the viscosity of precursor composition 2 was 3.6 cP.

<Preparation of Binding Agent>

After adding 6.7 g of ethyl cellulose ("STD 04" manufactured by NISSHIN KASEI CO., LTD.) to 93.3 g of ethanol (special grade, manufactured by Kishida Chemical Co., Ltd.) and mixing the resultant mixture, the mixture was stirred at room temperature for 24 hours, thereby obtaining a binding agent. The solid concentration of ethyl cellulose in the obtained binding agent is 6.7% by mass.

Example 1

As a ceramic particle, 0.05 g of a silica powder ("FEF 75A" manufactured by Admatechs, volume average particle diameter: 20 μm) was weighed, and a ceramic powder layer with approximately 5 to 10 mm square was formed on an alumina substrate. Subsequently, 50 μL of precursor composition 1 was applied to a half of the area of the above ceramic powder layer, which was made to be a sample. The obtained sample was placed in an electric furnace and was subjected to a heat treatment at 300° C. for 10 minutes. In the sample after the heating, a location to which precursor composition 1 had been applied was solidified, whereas a location to which nothing had been applied was not solidified, and ceramic particles therein were readily removed as they were. On the other hand, silica was formed in the solidified location.

Example 2

As a ceramic particle, 0.05 g of an alumina powder ("AO-509" manufactured by Admatechs, volume average particle diameter: 11 μm) was weighed, and a ceramic powder layer with approximately 5 to 10 mm square was formed on an alumina substrate. Subsequently, 0.05 mL of precursor composition 2 was applied to a half of the area of the above ceramic powder layer, which was made to be a sample. The obtained sample was placed in an electric furnace and was subjected to a heat treatment at 300° C. for 10 minutes. In the sample after the heating, a location to which precursor composition had been applied was solidified, whereas a location to which nothing had been applied was not solidified, and ceramic particles therein were readily removed as they were. On the other hand, alumina was formed in the solidified location.

Example 3

By using the silica powder used in Example 1, a ceramic powder layer of the first level of 10 mm×5 mm with a thickness of 1 mm was formed, and 0.04 mL of precursor composition 1 was then applied to the entire layer. Subsequently, onto the above ceramic powder layer, the same silica powder was used to form a ceramic powder layer of the second level with a thickness of 1 mm entirely, and 0.02 mL of precursor composition 1 was applied to a region of 5 mm×5 mm. Subsequently, the resultant object was turned over, making the ceramic powder layer of the second level downside, and onto the ceramic powder layer of the first level, the same silica powder was used to form a ceramic powder layer of the third level of 10 mm×5 mm with a thickness of 2 mm, thereby obtaining a laminated body.

The obtained laminated body was placed in an electric furnace and was subjected to a heat treatment at 400° C. for 60 minutes. By removing the silica powder of a region to which precursor composition 1 had not been applied, a three-dimensional object made of a ceramic having an overhang structure was obtained. In other words, the three-dimensional object made of a ceramic was obtained at a temperature lower than the conventional sintering temperature.

Example 4

By using the silica powder used in Example 1, a ceramic powder layer of the first level of 10 mm×5 mm with a thickness of 1 mm was formed, and 0.04 mL of precursor composition 1 was then applied to the entire layer. Subsequently, onto the above ceramic powder layer, the same silica powder was used to form a ceramic powder layer with a thickness of 1 mm entirely, and 0.02 mL of precursor composition 1 was applied to a region of 5 mm×5 mm, and 0.04 mL of the binding agent was applied to the remaining region of 5 mm×5 mm. Subsequently, the resultant object was turned over, making the ceramic powder layer of the second level downside, and onto the ceramic powder layer of the second level, the same silica powder was used to form a ceramic powder layer of the third level of 10 mm×5 mm with a thickness of 2 mm, thereby obtaining a laminated body.

While keeping the ceramic powder layer of the third level downside, the obtained laminated body was placed in an electric furnace and was subjected to a heat treatment at 400° C. for 60 minutes. By removing the silica powder of the region to which the binding agent had been applied, a three-dimensional object made of a ceramic having an overhang structure was obtained. In other words, the three-dimensional object made of a ceramic was obtained at a temperature lower than the conventional sintering temperature.

Comparative Example 1

By using the silica powder used in Example 1, a ceramic powder layer of the first level of 10 mm×5 mm with a thickness of 1 mm was formed, and 0.08 mL of the binding agent was then applied to the entire layer. Subsequently, onto the above ceramic powder layer, the same silica powder was used to form a ceramic powder layer of the second level with a thickness of 1 mm entirely, and 0.04 mL of the binding agent was applied to a region of 5 mm×5 mm, thereby obtaining a laminated body.

After removing the silica powder of a region to which the binding agent had not been applied from the obtained laminated body, the laminated body was placed in an electric furnace, making the ceramic powder layer of the second level downside, and was heated at 1400° C., which is not lower than the sintering temperature of the silica powder, for 60 minutes, thereby obtaining a three-dimensional object. Note that, upon removing the silica powder of the region to which the binding agent had not been applied from the laminated body, breakage occurred in the region to which the binding agent had been applied. In addition, deformation due to warping was confirmed in the obtained three-dimensional object.

Comparative Example 2

By using the silica powder used in Example 1, a ceramic powder layer of the first level of 10 mm×5 mm with a thickness of 1 mm was formed, and 0.08 mL of the binding agent was then applied to the entire layer. Subsequently, onto the ceramic powder layer of the first level, the same silica powder was used to form a ceramic powder layer of the second level with a thickness of 1 mm entirely, and 0.04 mL of the binding agent was applied to a region of 5 mm×5 mm. Subsequently, the resultant object was turned over, making the ceramic powder layer of the second level downside, and onto the ceramic powder layer of the first level, the same silica powder was used to form a ceramic powder layer of the third level with a thickness of 2 mm entirely, thereby obtaining a laminated body.

The obtained laminated body was placed in an electric furnace and was heated at 1400° C., which is not lower than the sintering temperature of the above silica powder, for 60 minutes, thereby obtaining a three-dimensional object. In the obtained three-dimensional object, regardless of the region to which the binding agent had been applied, a ceramic sintered body was formed throughout the entire laminated body, and an overhang structure was not obtained.

Comparative Example 3

By using the silica powder used in Example 1, a ceramic powder layer of the first level of 10 mm×5 mm with a thickness of 1 mm was formed, and 0.08 mL of the binding agent was then applied to the entire layer. Subsequently, onto the ceramic powder layer of the first level, the same silica powder was used to form a ceramic powder layer of the second level with a thickness of 1 mm entirely, and 0.04 mL of the binding agent was applied to a region of 5 mm×5 mm. Subsequently, the resultant object was turned over, making the ceramic powder layer of the second level downside, and onto the ceramic powder layer of the first level, the same silica powder was used to form a ceramic powder layer of the third level with a thickness of 2 mm entirely, thereby obtaining a laminated body.

The obtained laminated body was placed in an electric furnace and was heated at 400° C., which is a temperature higher than the degradation temperature of ethyl cellulose and lower than the sintering temperature of the silica powder, for 60 minutes. The laminated body after the heating was, regardless of the application of the binding agent, in the form of a particulate as a whole, and did not maintain the shape of a three-dimensional object.

Comparative Example 4

By using the silica powder used in Example 1, a ceramic powder layer of the first level of 10 mm×5 mm with a thickness of 1 mm was formed, and 0.04 mL of precursor composition 1 was then applied. Subsequently, onto the ceramic powder layer of the first level, the same silica powder was used to form a ceramic powder layer of the second level with a thickness of 1 mm entirely, and 0.02 mL of precursor composition 1 was applied to a region of 5 mm×5 mm. Subsequently, the resultant object was turned over, making the ceramic powder layer of the second level downside, and onto the ceramic powder layer of the first level, the same silica powder was used to form a ceramic powder layer of the third level with a thickness of 2 mm entirely, thereby obtaining a laminated body.

The obtained laminated body was placed in an electric furnace and was subjected to a heat treatment at 1400° C., which is not lower than the sintering temperature of the silica powder, for 60 minutes, thereby obtaining a three-dimensional object. In the obtained three-dimensional object, regardless of the application of precursor composition 1, a ceramic sintered body was formed throughout the entire laminated body, and an overhang structure was not obtained.

From Examples 3 and 4, and Comparative Examples 1 to 4, it was found that the production method of the present invention can achieve shaping with little deformation such as warping and having an overhang structure. As such, according to the production method of the present invention, three-dimensional objects made of ceramics can be provided with little limitation on the shape and the size.

Example 5

By using the silica powder used in Example 1, a ceramic powder layer of the first level of 10 mm×5 mm with a thickness of 1 mm was formed, and 0.02 mL of precursor composition 1 was then applied to a region of 5 mm×5 mm. Subsequently, onto the ceramic powder layer of the first level, a ceramic powder layer of the second level with a thickness of 1 mm was formed entirely, and by repeating a step of applying precursor composition 1 in an amount such that the precursor composition permeates into a depth of 1 mm entirely and drying the precursor composition until the total amount of precursor composition 1 to be applied reached 0.04 mL, a laminated body was obtained.

The obtained laminated body was placed in an electric furnace and was subjected to a heat treatment at 400° C. for 60 minutes. By removing the silica powder that had not been solidified, a three-dimensional object was obtained. The obtained three-dimensional object had an overhang structure.

Hereinafter, Examples according to the second embodiment of the present invention and Comparative Examples will be shown, but the present invention is not limited to these Examples.

Example 6 and Comparative Example 5

In the following, precursor compositions 3 to 7 were made for Example 6 and precursor composition 8 was made for Comparative Example 5, and evaluation was carried out thereon.

<Preparation of Precursor Composition 3>

After mixing 4.7 g of ethyl silicate (special grade, manufactured by Kishida Chemical Co., Ltd.) and 1.0 g of ethanol (special grade, manufactured by Kishida Chemical Co., Ltd.), the resultant mixture was stirred at room temperature for 4 hours, thereby obtaining solution A. Separately, 1.2 g of a 0.01 mol/L aqueous hydrochloric acid solution (manufactured by Kishida Chemical Co., Ltd.) and 3.1 g of ethanol (special grade, manufactured by Kishida Chemical Co., Ltd.), the resultant mixture was stirred at room temperature for 4 hours, thereby obtaining solution B. Solution B was added to solution A, and the resultant mixture was stirred for further 24 hours, thereby obtaining precursor composition 3. If the silicon component contained in precursor composition 3 have all become silica, the proportion of such silica to precursor composition 3 is 13.6% by mass.

<Preparation of Precursor Composition 4>

To 1.0 g of precursor composition 1, 1.0 g of a silica powder ("FEF 75A" manufactured by Admatechs, volume average particle diameter: 20 μm) was added, and by mixing the resultant mixture, precursor composition 4 was obtained.

<Preparation of Precursor Composition 5>

To 1.0 g of precursor composition 1, 1.0 g of a silica powder ("M.S.GEL EP-DM-50-1000AW" manufactured by AGC Si-Tech Co., Ltd., volume average particle diameter: 50 μm) was added, and by mixing the resultant mixture, precursor composition 5 was obtained.

<Preparation of Precursor Composition 6>

After mixing 5.2 g of aluminum sec-butoxide (manufactured by Tokyo Chemical Industry Co., Ltd.), 24.2 g of IPA (special grade, manufactured by Kishida Chemical Co., Ltd.) and 1.4 g of ethyl acetoacetate (special grade, manufactured by Kishida Chemical Co., Ltd.), the resultant mixture was stirred at room temperature for 4 hours, thereby obtaining solution C. Separately, 0.38 g of a 0.01 mol/L aqueous hydrochloric acid solution and 1.2 g of IPA (special grade, manufactured by Kishida Chemical Co., Ltd.), the resultant mixture was stirred at room temperature for 4 hours, thereby obtaining solution D. Solution D was added to solution C, and the resultant mixture was stirred for further 24 hours, thereby obtaining precursor composition 4. If the aluminum component contained in precursor composition 6 has all become alumina, the proportion of such alumina to precursor composition 6 is 3.3% by mass.

<Preparation of Precursor Composition 7>

To 1.0 g of precursor composition 4, 1.0 g of an alumina powder ("AO-509" manufactured by Admatechs, volume average particle diameter: 11 μm) was added, and by mixing the resultant mixture, precursor composition 7 was obtained.

<Preparation of Precursor Composition 8>

After mixing 4.7 g of ethyl silicate (special grade, manufactured by Kishida Chemical Co., Ltd.) and 1.0 g of ethanol (special grade, manufactured by Kishida Chemical Co., Ltd.), the resultant mixture was stirred at room temperature for 4 hours, thereby obtaining solution E. Separately, after mixing 1.2 g of a 0.01 mol/L aqueous ammonia solution and 3.1 g of ethanol (special grade, manufactured by Kishida Chemical Co., Ltd.), the resultant mixture was stirred at room temperature for 4 hours, thereby obtaining solution F. Solution F was added to solution E, and the resultant mixture was stirred for further 24 hours, thereby obtaining precursor composition 8. If the silicon component contained in precursor composition 8 have all become silica, the proportion of such silica to precursor composition 8 is 13.6% by mass.

<Evaluation on Lamination Property>

After dropping each of the above precursor compositions 3 to 8, the precursor composition was dried at 22° C. to form a ceramic layer. Subsequently, by repeating five times dropping the same precursor composition onto the ceramic layer that had been formed previously and superposing a layer, a three-dimensional object was made.

For each of the three-dimensional objects made from precursor compositions 3 to 7, the shape thereof was maintained even when the three-dimensional object was directly touched by and handled with hands, but in the three-dimensional object made from precursor composition 8, cracks occurred, and the shape thereof was collapsed while directly touching and handling the three-dimensional object with hands. As such, it was found that, according to the present invention, firm three-dimensional objects made of ceramics are obtained even when a heating treatment at a high temperature is not carried out.

Example 7 and Comparative Example 6

As Example 7, a composite of a ceramic and an ABS resin (acrylonitrile-butadiene-styrene copolymer) was produced. The production steps are shown in FIG. 5A to FIG. 5G.

Figure 5A:
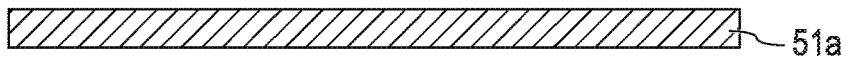
FIG. 5A is a schematic cross sectional drawing showing a step of Example 2 according to the present invention.
Figure 5B:
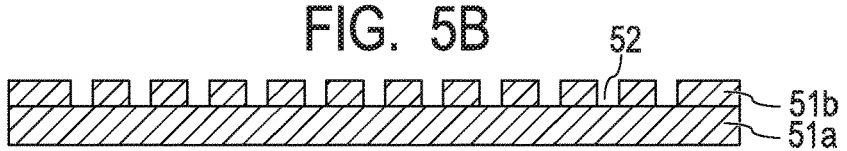
FIG. 5B is a schematic cross sectional drawing showing a step of Example 2 according to the present invention.
Figure 5C:
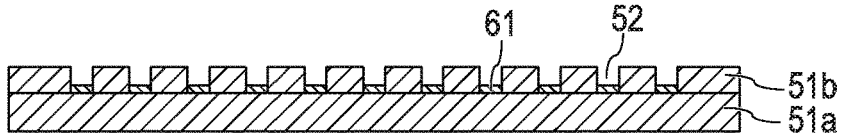
FIG. 5C is a schematic cross sectional drawing showing a step of Example 2 according to the present invention.

ABS resin layer 51a of 80 mm length×10 mm width×0.53 mm thickness was made by extruding an ABS resin into a metal mold of 80 mm length×10 mm width with a depth of 10 mm (FIG. 5A). Subsequently, in the metal mold, ABS resin layer 51b having eleven grooves 52 in the longitudinal direction with an interval of 0.5 mm therebetween was made on the above ABS resin layer 51a by extruding the ABS resin, the groove having a width of 0.3 mm and a thickness of 0.35 mm (FIG. 5B). Precursor composition 4 made in Example 6 was applied into the above grooves 52, dried at 20° C., and solidified to form ceramic layer 61 with a thickness of 0.005 mm (FIG. 5C).

Figure 5D:
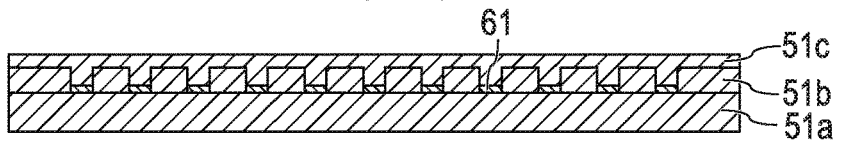
FIG. 5D is a schematic cross sectional drawing showing a step of Example 2 according to the present invention.

Thereafter, the ABS resin was extruded into the metal mold to fill in grooves 52 in which ceramic layer 61 had been formed, and at the same time, ABS resin layer 51c with a thickness of 0.18 mm was laminated onto ABS resin layer 51b (FIG. 5D).

Figure 5E:
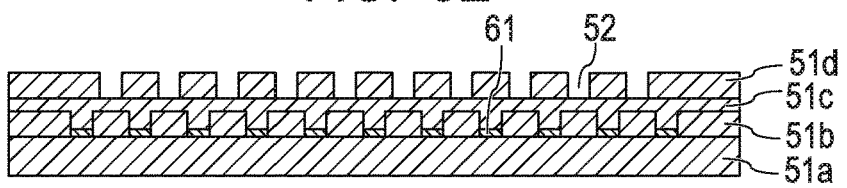
FIG. 5E is a schematic cross sectional drawing showing a step of Example 2 according to the present invention.
Figure 5F:
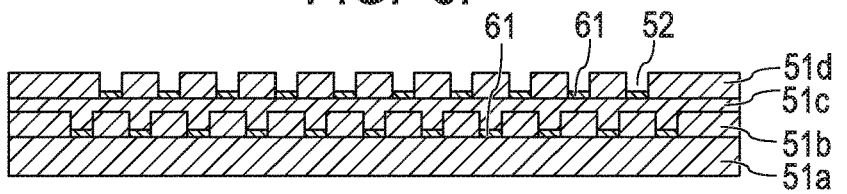
FIG. 5F is a schematic cross sectional drawing showing a step of Example 2 according to the present invention.

Subsequently, in the same manner as ABS resin layer 51b, ABS resin layer 51d having ten grooves 52 in the longitudinal direction with an interval of 0.5 mm therebetween was made, the groove having a width of 0.3 mm and a thickness of 0.35 mm (FIG. 5E). Precursor composition 4 made in Example 6 was applied into grooves 52, dried at 22° C., and solidified to form ceramic layer 61 with a thickness of 0.005 mm (FIG. 5F).

Thereafter, ABS resin layer 51c with a thickness of 0.18 mm was laminated in the metal mold. Subsequently, both of a step of forming ABS resin layer 51b, ceramic layer 61 and ABS resin layer 51c and a step of forming ABS resin layer 51d, ceramic layer 61 and ABS resin layer 51c were repeated two times.

Figure 5G:
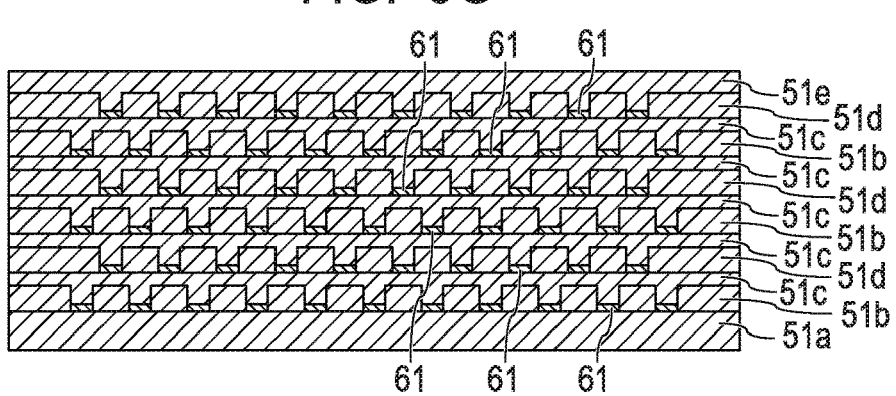
FIG. 5G is a schematic cross sectional drawing showing a step of Example 2 according to the present invention.

At last, ABS resin layer 51e with a thickness of 0.29 mm was formed. The laminated body was taken out of the metal mold, and a three-dimensional object of 80 mm×10 mm×3.82 mm was obtained (FIG. 5G). As shown in FIG. 5G, the obtained three-dimensional object was confirmed to be a composite having ceramic layers 61 inside the ABS resin layers.

In the same manner as Example 7 except that ceramic layer 61 was not formed, by laminating ABS resin layers 51a to 51e, a three-dimensional object of Comparative Example 6 of 80 mm×10 mm×3.82 mm was obtained.

<Evaluation on Bending Strength of Three-Dimensional Object>

By using an autograph ("AG-20kNIST" manufactured by Shimadzu Corporation), the bending strength was measured through an approach in accordance with JIS K 7171. As a result, it was confirmed that, in the three-dimensional object of Example 7, the bending strength and the bending elastic modulus are improved compared to the three-dimensional object of Comparative Example 6, and it was confirmed that the properties of the resin molded body are improved due to the simultaneous ceramic shaping.

According to the present invention, the precursor composition that has been applied to the ceramic powder layer is turned into a ceramic through sol-gel method, and therefore, only the ceramic powder of the shaping part can be bound firmly. As such, three-dimensional objects made of ceramics can be provided with no warping or breakage and with no limitation on the shape and the size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of producing a three-dimensional object through additive manufacturing, comprising:
   repeating multiple times forming a ceramic powder layer formed of a ceramic powder and applying to a desired region of the ceramic powder layer a liquid precursor composition at least containing at least one of a metal alkoxide, a metal chloride, a hydrolysate of the metal alkoxide and a polycondensate of the hydrolysate, and water, thereby obtaining a laminated body;
   heating the laminated body at a temperature lower than the sintering temperature of the ceramic powder; and
   removing the ceramic powder in a region to which the precursor composition has not been applied from the laminated body after the heating.

2. The method of producing a three-dimensional object according to claim 1, wherein the precursor composition contains an organic solvent.

3. The method of producing a three-dimensional object according to claim 2, wherein the organic solvent is any of an alcohol, a ketone and a hydrocarbon.

4. The method of producing a three-dimensional object according to claim 1, wherein the ceramic powder is a metal oxide.

5. The method of producing a three-dimensional object according to claim 1, wherein the ceramic powder comprises the composition of a ceramic formed from the metal alkoxide.

6. The production method according to claim 1, wherein the ceramic powder layer is pressurized.

7. The method of producing a three-dimensional object according to claim 1, wherein the obtained three-dimensional object is heated at a temperature higher than the heating temperature for the laminated body.

8. The method of producing a three-dimensional object according to claim 1, wherein the method comprises drying the precursor composition applied to the ceramic powder layer, and the temperature at which the laminated body is heated is higher than a temperature at which the precursor composition is dried.

9. The method of producing a three-dimensional object according to claim 1, wherein the precursor composition is heated to be applied to the ceramic powder layer.

10. The method of producing a three-dimensional object according to claim 1, wherein a proportion of a ceramic formed from the precursor composition to the precursor composition is 0.1% by mass or more.

11. The method of producing a three-dimensional object according to claim 1, wherein a solution of a resin is applied to a region of the ceramic powder layer to which the precursor composition has not been applied, the resin being degraded at the temperature at which the laminated body is heated.

12. A production apparatus for producing a three-dimensional object through additive manufacturing, comprising:
   a stage on which a three-dimensional object is formed;
   a unit forming a ceramic powder layer on the stage;
   a unit applying to a desired region of the ceramic powder layer a liquid precursor composition at least containing at least one of a metal alkoxide, a metal chloride, a hydrolysate of the metal alkoxide and a polycondensate of the hydrolysate, and water;
   a unit heating a laminated body formed by laminating a plurality of the ceramic powder layers to which the precursor composition has been applied; and
   a unit reversibly changing the relative positions of the unit forming the ceramic powder layer and the unit applying the precursor composition with regard to the stage.

13. The production apparatus for a three-dimensional object according to claim 12, comprising a unit drying the precursor composition at a stage subsequent to the unit applying the precursor composition.

14. The production apparatus for a three-dimensional object according to claim 12, comprising a unit pressurizing the ceramic powder layer.

15. The production apparatus for a three-dimensional object according to claim 12, comprising a unit heating the ceramic powder layer at a stage prior to the unit applying the precursor composition.

16. A method of producing a three-dimensional object through additive manufacturing, wherein forming a precursor composition layer from a liquid precursor composition at least containing at least one of a metal alkoxide, a metal chloride, a hydrolysate of the metal alkoxide and a polycondensate of the hydrolysate, an acidic catalyst promoting hydrolysis of the metal alkoxide, and water, where a proportion of a ceramic formed from the precursor composition to the precursor composition is 1% by mass or more; and drying the precursor composition layer, thereby forming a ceramic layer are repeated multiple times.

17. The method of producing a three-dimensional object according to claim 16, wherein the precursor composition contains an organic solvent.

18. The method of producing a three-dimensional object according to claim 17, wherein the organic solvent is any of an alcohol, a ketone and a hydrocarbon.

19. The method of producing a three-dimensional object according to claim 16, wherein the acidic catalyst is hydrochloric acid or acetic acid.

20. The method of producing a three-dimensional object according to claim 16, wherein a thickness of the ceramic layer is 0.05 μm or more and 1 mm or less.

21. The method of producing a three-dimensional object according to claim 16, wherein the precursor composition contains an inorganic particle.

22. The method of producing a three-dimensional object according to claim 21, wherein the inorganic particle is a metal oxide.

23. The method of producing a three-dimensional object according to claim 22, wherein the metal oxide at least contains a metal element contained in the metal alkoxide or metal chloride.

24. The method of producing a three-dimensional object according to claim 16, wherein the precursor composition is a sol containing a polycondensate formed through hydrolysis and polycondensation reaction of the metal alkoxide.

25. The method of producing a three-dimensional object according to claim 21, wherein the precursor composition is a sol containing a polycondensate formed through hydrolysis and polycondensation reaction of the metal alkoxide, and a size of the inorganic particle is larger than that of the polycondensate.

26. The method of producing a three-dimensional object according to claim 16, wherein a solid concentration of the precursor composition is 50% by mass or less.

27. The method of producing a three-dimensional object according to claim 16, comprising laminating a plurality of the ceramic layers, followed by heating and sintering the ceramic layers.

28. The method of shaping a three-dimensional object according to claim 16, wherein a three-dimensional object formed of a resin and a ceramic is formed by repeating multiple times forming the ceramic layer in contact with a resin precursor layer or a resin layer.

29. A liquid precursor composition used for additive manufacturing, wherein the precursor composition at least contains at least one of a metal alkoxide, a metal chloride, a hydrolysate of the metal alkoxide and a polycondensate of the hydrolysate, an acidic catalyst promoting hydrolysis of the metal alkoxide, and water, where a proportion of a ceramic formed from the precursor composition to the precursor composition is 1% by mass or more.

* * * * *